(12) United States Patent
Aizawa et al.

(10) Patent No.: US 7,754,373 B2
(45) Date of Patent: Jul. 13, 2010

(54) SEALED PRISMATIC BATTERY

(75) Inventors: Yoshihiko Aizawa, Ibaraki (JP); Yoshiki Somatomo, Ibaraki (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 562 days.

(21) Appl. No.: 11/589,223

(22) Filed: Oct. 30, 2006

(65) Prior Publication Data
US 2007/0099070 A1  May 3, 2007

(30) Foreign Application Priority Data
Oct. 31, 2005  (JP) .............................. 2005-317439

(51) Int. Cl.
*H01M 2/02* (2006.01)
*H01M 2/12* (2006.01)

(52) U.S. Cl. .............................. 429/82; 429/56; 429/176
(58) Field of Classification Search .................. 429/56, 429/82, 176
See application file for complete search history.

(56) References Cited

U.S. PATENT DOCUMENTS

| 6,159,631 | A * | 12/2000 | Thompson et al. | 429/82 |
| 6,432,572 | B1 * | 8/2002 | Yoshida et al. | 429/56 |
| 2005/0069760 | A1 | 3/2005 | Somatomo | |

FOREIGN PATENT DOCUMENTS

| JP | 11-185714 A | 7/1999 |
| JP | 2000-285892 A | 10/2000 |
| JP | 2001-143664 A | 5/2001 |
| JP | 2001-266804 A | 9/2001 |
| JP | 2001-345033 A | 12/2001 |
| JP | 2002-25525 A | 1/2002 |
| JP | 2003-297322 A | 10/2003 |
| JP | 2004-39294 A | 2/2004 |
| JP | 2004-79330 A | 3/2004 |
| JP | 2005-38773 A | 2/2005 |
| JP | 2005-108584 A | 4/2005 |

* cited by examiner

*Primary Examiner*—Gregg Cantelmo
(74) *Attorney, Agent, or Firm*—Birch, Stewart, Kolasch & Birch, LLP

(57) ABSTRACT

There is provided a sealed prismatic battery having an opening vent excellent in reliability with use of a deformed state of a battery casing on occasion of abnormal increase in internal pressure of the battery.

The battery casing is shaped like an oval quadrangle having a width in a direction of thickness smaller than a height in a longitudinal direction and a length in a lateral direction, and side walls of the casing that face in the lateral direction swell outward in the lateral direction so as to form circular-arc shapes in general. The opening vent is composed of a groove formed as a recess on the side wall. A distances from the upper end of the battery casing to the groove is set between 3 and 20% of the longitudinal height of the battery casing.

3 Claims, 11 Drawing Sheets

SEALED PRISMATIC BATTERY

BACKGROUND OF THE INVENTION

The present invention relates to a sealed prismatic battery in which an abnormal increase in internal pressure of the battery would cause an opening vent to cleave and would thus result in release of gas from within the battery.

In a sealed prismatic battery such as primary battery using lithium metal as active material and secondary battery undergoing charge and discharge with use of lithium ion, when an excessive electrical load is applied or an excessive thermal load is applied, a short circuit occurs within the battery thus generating gas, and an internal pressure of the battery abnormally increases. When the battery is overcharged, gas is generated within the battery due to decomposition of electrolyte and thus the internal pressure of the battery increases abnormally.

When the battery can no longer withstand the abnormal increase in the internal pressure, the battery casing would explode and contents thereof, such as electrolyte, would be spattered. Therefore, a battery casing is provided with an opening vent as disclosed in various patent documents such as JP H11-185714 A (FIGS. 2, 4), JP 2000-285892 A (FIG. 2), JP 2001-143664 A (FIGS. 1-6), JP 2001-266804 A (FIGS. 2-10), JP 2001-345083 A (FIGS. 2-20), JP 2002-25525 A (FIGS. 1, 2), JP 2003-297322 A (FIGS. 3, 6-8), JP 2004-39294 A (FIGS. 3-9), JP 2004-79330 A (FIGS. 3, 7-10), JP 2005-108584 A (FIGS. 1, 6-8), and JP 2005-38773 A (FIGS. 3, 5). With an abnormal increase in internal pressure of the battery, deformation of the battery casing causes cleavage in the opening vent, and gas in the battery is released through the cleavage.

In a sealed prismatic battery used in compact electronic apparatus such as portable telephone, a battery casing is shaped like an oval quadrangle having a width in a direction of thickness smaller than a height in a longitudinal direction and than a length in a lateral direction. With an abnormal increase in internal pressure of the battery, center parts of side walls of the battery casing that face in the direction of thickness expand outward, and side walls of the battery casing that face in the lateral direction and walls thereof that face in the longitudinal direction deform so that the central parts thereof are recessed curvedly.

The applicant thought that provision of the opening vent at a site on the battery casing prone to great deformation xvas preferable in terms of reliable cleavage action, and examined which was the best place to be provided with the opening vent among the side walls facing in the lateral direction, the side walls facing in the direction of thickness, and the walls facing in the longitudinal direction on the battery casing. Though provision of the opening vents on the side walls facing in the direction of thickness or the wails facing in the longitudinal direction on the battery casing is disclosed in the above patent documents, it has been found that the deformation in the side walls facing in the direction of thickness and the walls facing in the longitudinal direction is not so great. In accordance with the above patent documents, that is, reliable cleavage action of the opening vent cannot be assured and reliability of the opening vent is thus poor.

In the sealed rectangular oval battery in which the side walls of the battery casing that face in the lateral direction are generally shaped like circular arcs swelling outward in the lateral direction, strengths of the side walls facing in the lateral direction are increased and thus the side walls resist being deformed. When the internal pressure of the battery increases abnormally, accordingly, stresses are concentrated in vicinity of upper and lower ends of the side walls of the battery casing facing in the lateral direction and the upper and lower ends are greatly deformed.

SUMMARY OF THE INVENTION

An object of the present invention is to provide a sealed prismatic battery having an opening vent excellent in reliability with use of a deformed state of a battery casing on occasion of abnormal increase in internal pressure of the battery.

In order to fulfill the object, the sealed prismatic battery of the invention has a battery casing which is shaped like an oval quadrangle having a width smaller than a height in a longitudinal direction and than a length in a lateral direction and in which side walls facing in the lateral direction swell outward in the lateral direction so as to form circular-arc shapes in general, and an opening vent which is provided in vicinity of a longitudinal end on at least one of the side walls of the battery casing facing in the lateral direction, the opening vent is composed of at least one groove formed as a recess on the side wall, and a distance from the end of the side wall of the battery casing to the groove is set between 3 and 20% of the height of the battery casing.

In the sealed prismatic battery of the invention, the opening vent may be formed of the groove that is shaped like a letter U in side view and that has a center curved part directed to one end side on the battery casing with respect to the longitudinal direction or may be formed of the groove that is shaped like a letter V in side view and that has a center angled part directed to end side on the battery casing with respect to the longitudinal direction.

In the sealed prismatic battery of the invention, the groove constituting the opening vent may be formed as a recess having a V-shaped section.

In the invention, the opening vent is provided in part that has been found to greatly deform in case of the abnormal increase in the internal pressure of the battery, i.e., in vicinity of the longitudinal ends on one side of the lateral side walls of the battery casing. In case of the abnormal increase in the internal pressure of the battery, therefore, the opening vent reliably cleaves to release the internal pressure of the battery. As a result, the opening vent excellent in reliability can be provided in the sealed prismatic battery.

With the opening vent formed of the groove shaped like a letter U or V in side view, in case of the abnormal increase in the internal pressure of the battery, the opening vent is easily torn off from a position corresponding to the center curved part, the center angled part 25 or the like of the groove and the internal pressure of the battery is reliably released from the cleavage.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE PREFERRED EMBODIMENTS

Figure 3:
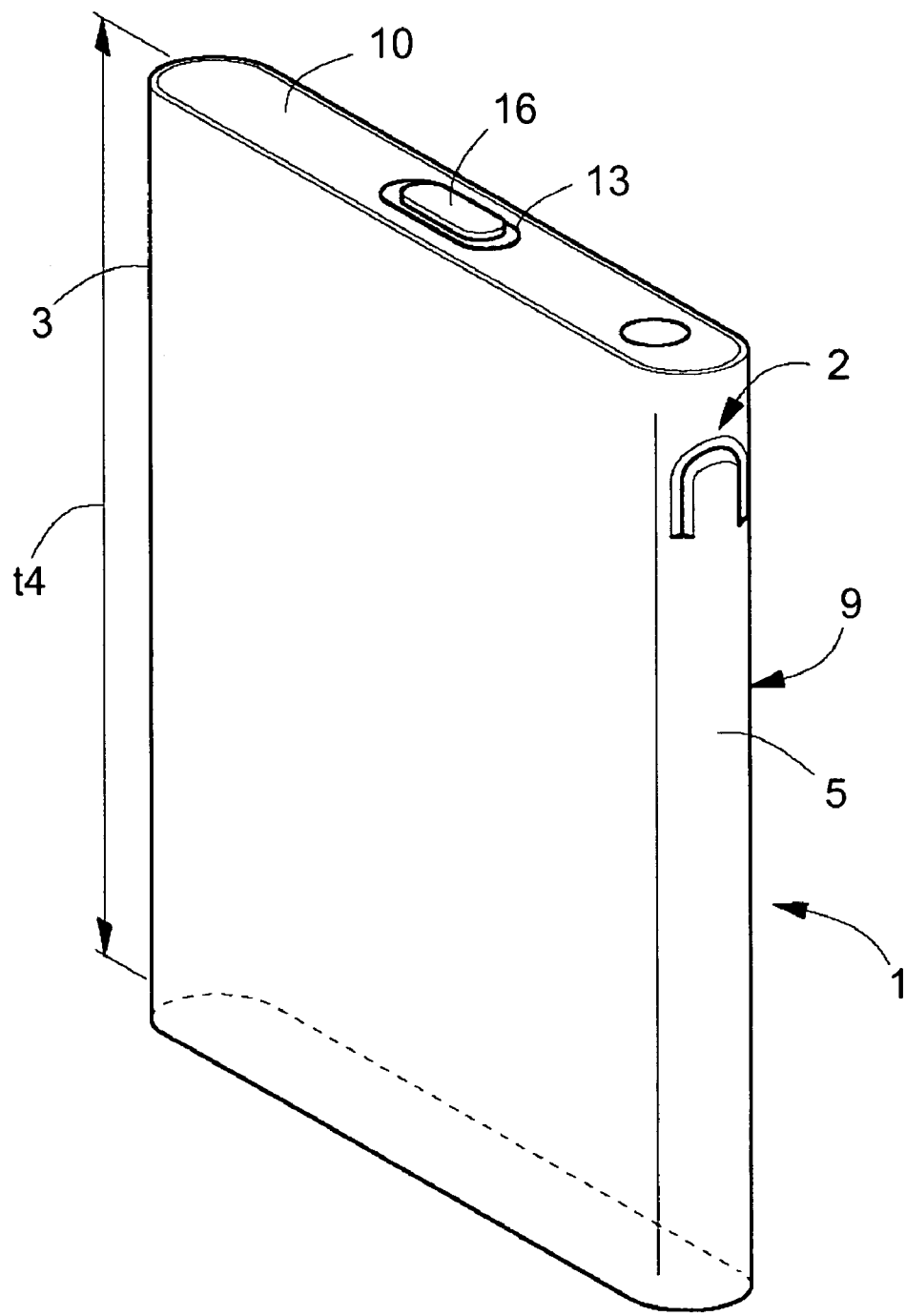
FIG. 3 is a perspective view of the battery of Embodiment 1.
Figure 5:
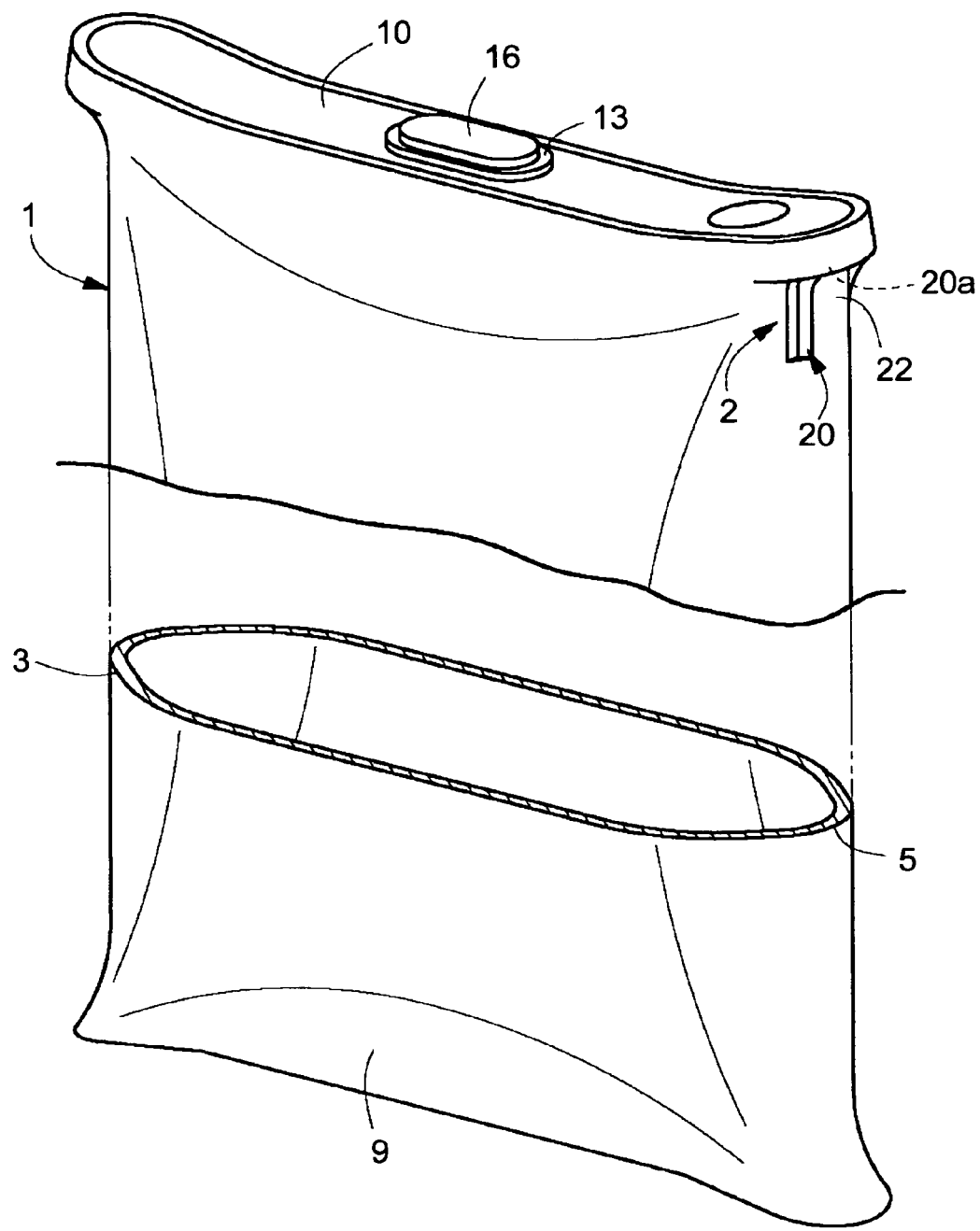
FIG. 5 is a perspective view illustrating an expanded state of the battery.

In a sealed prismatic battery of the present invention, as shown in FIG. 3, a battery casing 1 is shaped like an oval quadrangle having a width in a direction of thickness smaller than a height in a longitudinal direction and than a length in a lateral direction, and side walls 3, 5 that face in the lateral direction swell outward in the lateral direction so as to have circular arc sections. When internal pressure of the battery increases abnormally in the sealed rectangular oval battery, great deformation is caused in vicinity of upper and lower ends of the side walls 3, 5 of the battery easing 1 facing in the lateral direction, more specifically, at sites deviated longitudinally from the upper and lower ends of the casing 1 toward center by 3 to 20% of the height of the casing 1, as shown in FIG. 5.

Figure 1:
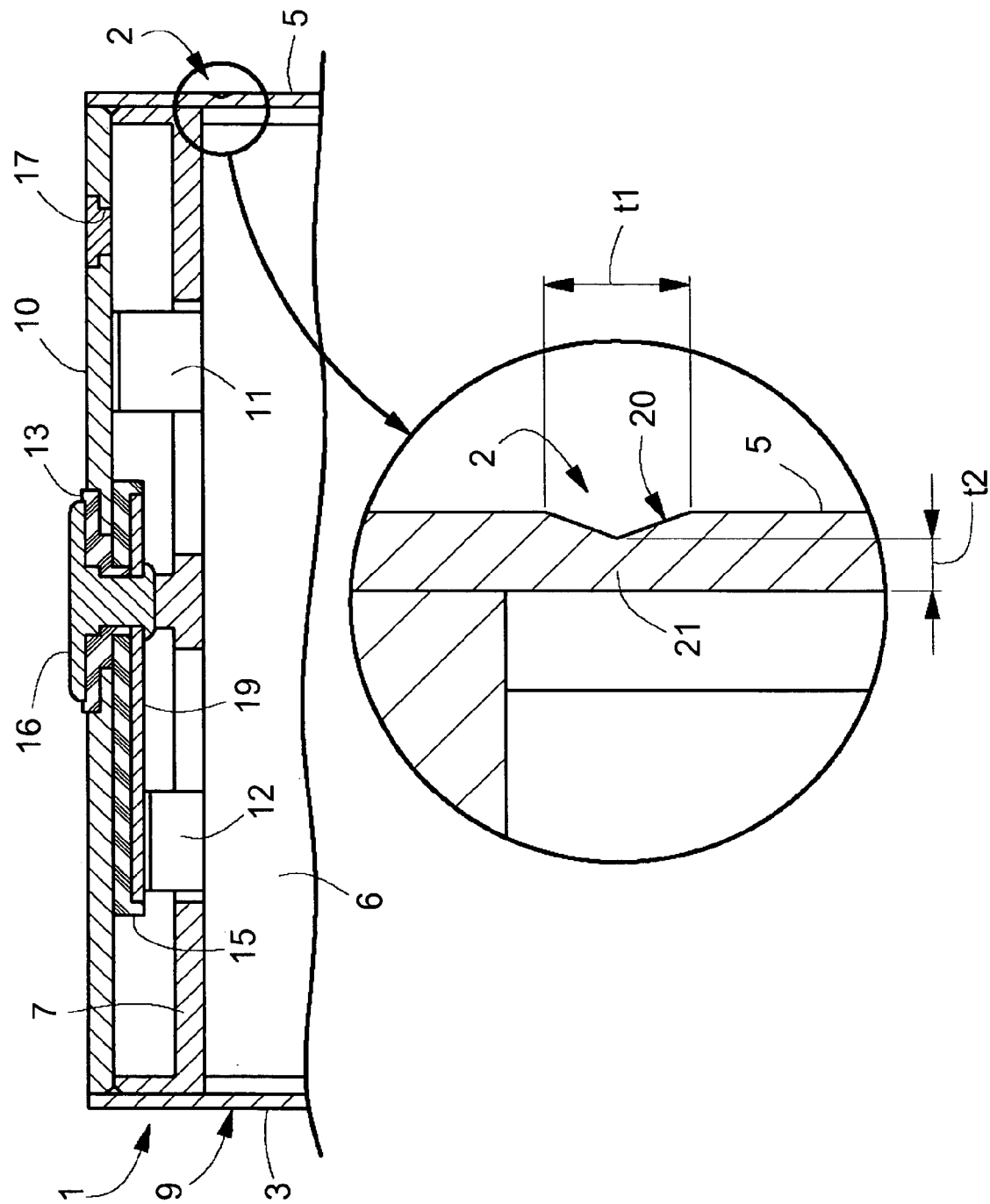
FIG. 1 is a front longitudinal section of a sealed prismatic battery of Embodiment 1 according to the present invention.

As shown in FIG. 1, the battery casing 1 is provided with an opening vent 2 in vicinity of a longitudinal end (i.e., an upper or lower end) on at least one of the side walls 3, 5. The opening vent 2 comprises a groove 20 formed as a recess on at least one side wall 5 of the battery casing 1 facing in the lateral direction and so that a distance t3 from the upper end of the battery casing 1 to the groove 20 is set within a range of 3 to 20% of the height t4 of the battery casing 1.

The opening vent 2 may be provided on either one or both of the side walls 3, 5 of the battery casing 1 facing in the lateral direction and may be provided at either one or both of the upper and lower ends of the side walls 3, 5. The opening vent 2 may be formed of one or more grooves 20 linear or curvilinear in side view or may be formed of a groove 20 in a shape of a combination of straight lines and curved lines in side view. Among shapes of section of the groove 20 are included a shape like a letter V, a shape like a letter U, a trapezoid in which width of the groove increases from a flat surface at a bottom of the groove toward an open face, and the like.

Appropriate for a shape of the side walls 3, 5 of the battery casing 1 facing in the lateral direction is a swelling shape generally like a circular arc, such as a circular one, an elliptical one, and an oval one. Such shapes include one having a flat surface at extremity of the swell or the like on the side wall 3, 5 facing in the lateral direction. A width of the flat surface in the direction of thickness is preferably not larger than 2 mm.

Figure 2:
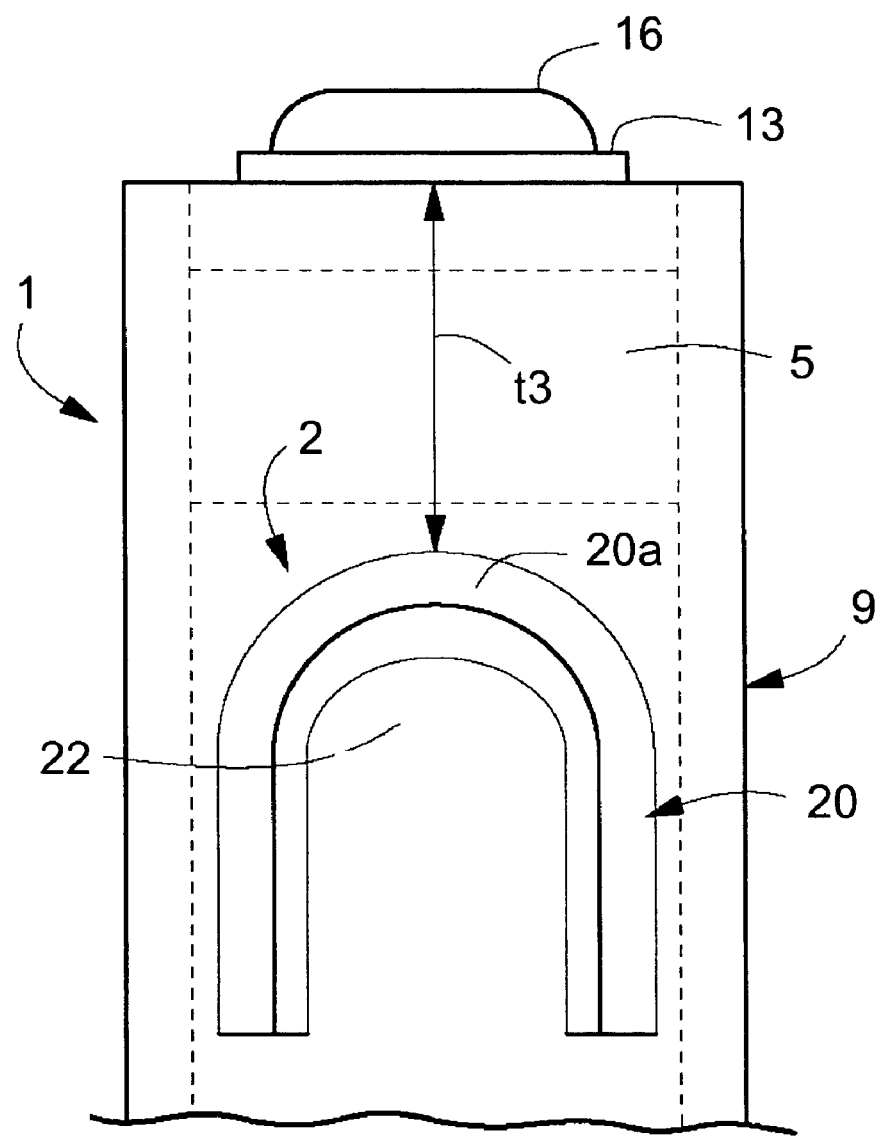
FIG. 2 is a partial side view of the battery of Embodiment 1.
Figure 6:
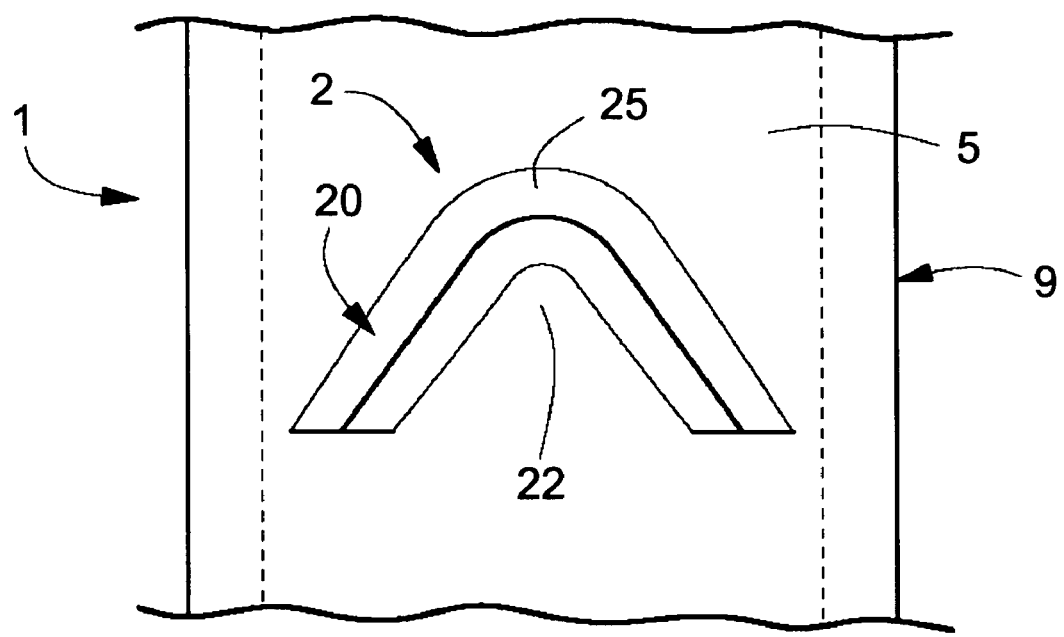
FIG. 6 is a side view of an opening vent of Embodiment 2.

The opening vent 2 is formed of a groove that is shaped like a letter U in side view and that has center curved part 20a positioned on one end side on the battery casing 1 with respect to the longitudinal direction, as shown in FIG. 2, or is formed of a groove 20 that is shaped like a letter V in side view and that has center angled part 25 positioned on one end side on the battery casing 1 with respect to the longitudinal direction, as shown in FIG. 6.

The groove 20 constituting the opening vent 2 is formed as a recess having a V-shaped section, as shown in FIG. 1, in terms of processability and the like.

Embodiment 1

FIGS. 1 through 5 show a secondary lithium battery as Embodiment 1 of the sealed prismatic battery of the invention. As shown in FIG. 3, the opening vent 2 that cleaves to release an internal pressure of the battery on occasion of an abnormal increase in the internal pressure of the battery is provided on the battery casing 1 shaped like the oval quadrangle having the width in the direction of thickness smaller than the height in the longitudinal direction and the length in the lateral direction. The left and right side walls 3, 5 of the battery casing 1 swell outward in the left and right direction or in the lateral direction so as to have a circular-arc section in general (see FIG. 4). The opening vent 2 is provided in vicinity of the upper end of the right side wall 5.

As shown in FIG. 1, an electrode 6 and non-aqueous electrolyte are sealed and contained in the battery easing 1 and a plastic insulator 7 is provided in upper end part in the battery casing 1. The opening vent 2 is placed in a position distant downward from the insulator 7 in order to ensure the cleavage of the opening vent 2 in event of the increase in the internal pressure of the battery. The length of the battery casing 1 in the lateral direction is 34 mm, the width thereof in the direction of thickness is 5 mm, and the height in the longitudinal direction is 45 mm.

The battery casing 1 comprises a square-cylinder-shaped casing body 9 having a bottom and an opening upper face, and an oblong lid wall 10 closing the opening upper face of the casing body 9 in a sealing manner. The opening vent 2 is produced by press molding on the right side wall 5 of the casing body 9 when the opening upper face of the casing body 9 is subjected to a trimming process. The casing body 9 is formed from a stainless steel plate or the like by deep drawing. Selected as material of the casing body 9 is aluminum, iron or stainless steel, or alloy of those. The opening vent 2 may be formed by cutting process.

For manufacture of the electrode body 6, a positive electrode and a negative electrode are spirally wound together with a separator interposed therebetween, and the whole body is thereafter pressed and deformed into a flat shape having a quadrangle section so as to fit in with a transverse section of the battery casing 1. A positive collector lead 11 made of aluminum is drawn upward from the positive electrode of the electrode body 6, and a negative collector lead 12 made of nickel is drawn upward from the negative electrode thereof.

The lid wall 10 is a press molding made from a metal plate such as aluminum alloy having electric conductivity. A peripheral edge of the lid wall 10 is seal-welded, with use of laser, to a periphery of the upper end opening of the casing body 9. A negative terminal 16 is mounted through center part of the lid wall 10 with passing upper and lower insulating packing 13 and 15. A thickness of the lid wall 10 is set at 0.8 mm.

A liquid injection hole 17 is provided on right end side of the lid wall 10, and the electrolyte is injected through the hole 17 into the battery casing 1. The liquid injection hole 17 is sealed after the injection of the electrolyte. To a lower end of the negative terminal 16 is connected a lead 19 made of a rectangular thin plate elongated in the lateral direction. The lead 19 extends toward a side opposite to the liquid injection hole 17 and is insulated from the lid wall 10 with the lower insulating packing 15. The negative collector lead 12 is welded by laser to a lower surface of the lead 19.

The positive collector lead 11 is spot-welded onto an inner surface of the lid wall 10 between the lower insulating packing 15 and the liquid injection hole 17. In this way, continuity between the positive collector lead 11 and the battery casing 1 is established, so that the battery casing 1 doubles as the positive terminal.

Figure 4:
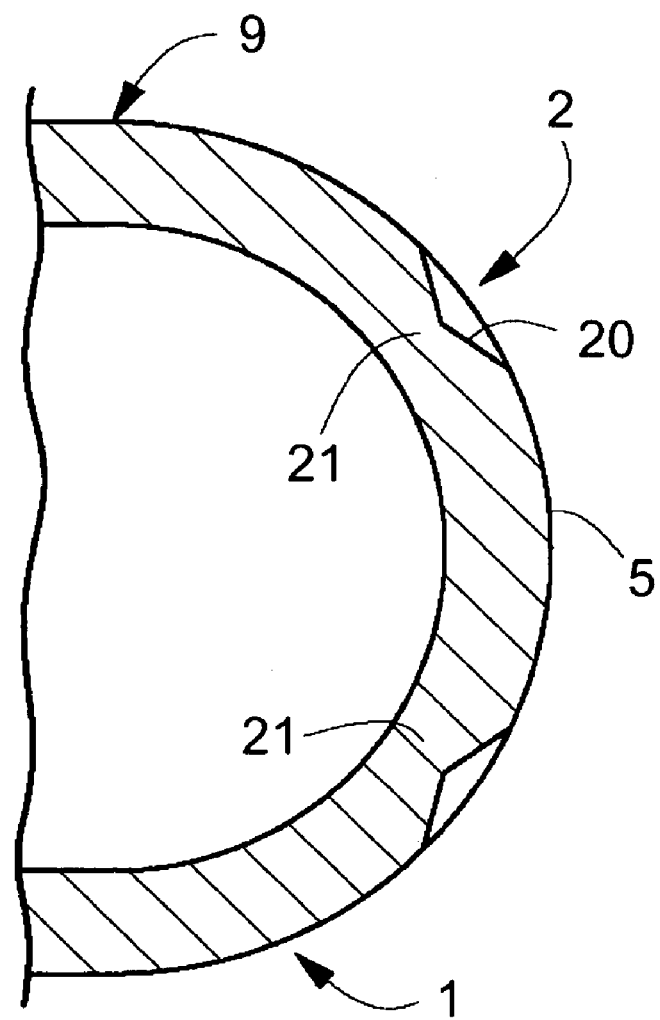
FIG. 4 is a sectional plan view of an opening vent.

The opening vent 2 is formed of the groove 20 that is shaped like a letter U in side view, as shown in FIG. 2. The groove 20 has the center curved part 20a positioned on the upper end side of the battery casing 1 on the right side wall 5 of the casing 1 and is formed as the recess having the V-shaped section in the right side wall 5, as shown in FIGS. 1 and 4. The width t1 of the groove 20 is set at 0.3 mm. A thickness t2 of a thin wall (remaining thickness) 21 defined by the groove 20 on the right side wall 5 of the battery casing 1 is set at 0.15 mm. The distance t3 from the upper end of the battery casing 1 to the center curved part 20a of the groove 20 is set at 7% of the longitudinal height t4 (FIG. 3) of the casing body 9. Thicknesses of the left and right side walls 3 and 5 of the casing body 9 are set at 0.3 mm.

When the internal pressure of the battery abnormally increases, there occur expansion and deformation in the battery casing 1. As shown in FIG. 5, specifically, the center parts of the front and back side walls of the casing body 9 that face in the direction of thickness expand outward, and the left and right side walls 3, 5 and the bottom wall of the casing body 9 and the lid wall 10 deform curvedly so that the central parts thereof are recessed.

In case that the internal pressure of the battery abnormally increases beyond a given value, the left and right side walls 3 and 5 of the casing body 9 are sharply bent so that the upper and lower end sides thereof protrude outward left and right relative to the center parts because the side walls 3, 5 are formed so as to have the circular arc sections and are all the more resistant to deformation (see a state shown in FIG. 5). On this occasion, as shown in FIG. 2, a tongue part 22 that is defined by the groove 20 remains behind without being bent, because of rigidity thereof, and thus the deformation of the upper part of the right side wall 5 serves to pull the thin wall 21 toward inside of the battery.

Tensilities exerted on the thin wall 21 toward the inside are increased in the center curved part 20a of the groove 20. Accordingly, the thin part 21 is torn off from a position corresponding to the center curved part 20a, and the internal pressure of the battery is released from the cleavage.

Thus the opening vent 2 is provided in vicinity of the upper end of the right side wall 5 of the battery casing 1 that greatly deforms on occasion of the abnormal increase in the internal pressure of the battery. Therefore, the opening vent 2 reliably cleaves in case of the abnormal increase in the internal pressure of the battery.

Embodiment 2

FIG. 6 shows Embodiment 2 of the sealed prismatic battery of the invention. A groove 20 of an opening vent 2 is shaped like a letter V in side view, and center angled part 25 is positioned on upper end side on a right side wall 5 of a casing body 9 and two leg parts extends downward from the center angled part 25 so as to straddle. Other features are made the same as those of Embodiment 1.

In Embodiment 2 as is the case with Embodiment 1, if upper and lower end parts of left and right side walls 3 and 5 of a battery casing 1 are sharply bent on account of abnormal increase in internal pressure of a battery, a V-shaped tongue part 22 defined by the groove 20 pulls a thin wall 21 of the groove 20. Accordingly, the thin part 21 is easily torn off from a position corresponding to the center angled part 25, and the internal pressure of the battery is released from that cleavage.

Embodiment 3

Figure 7:
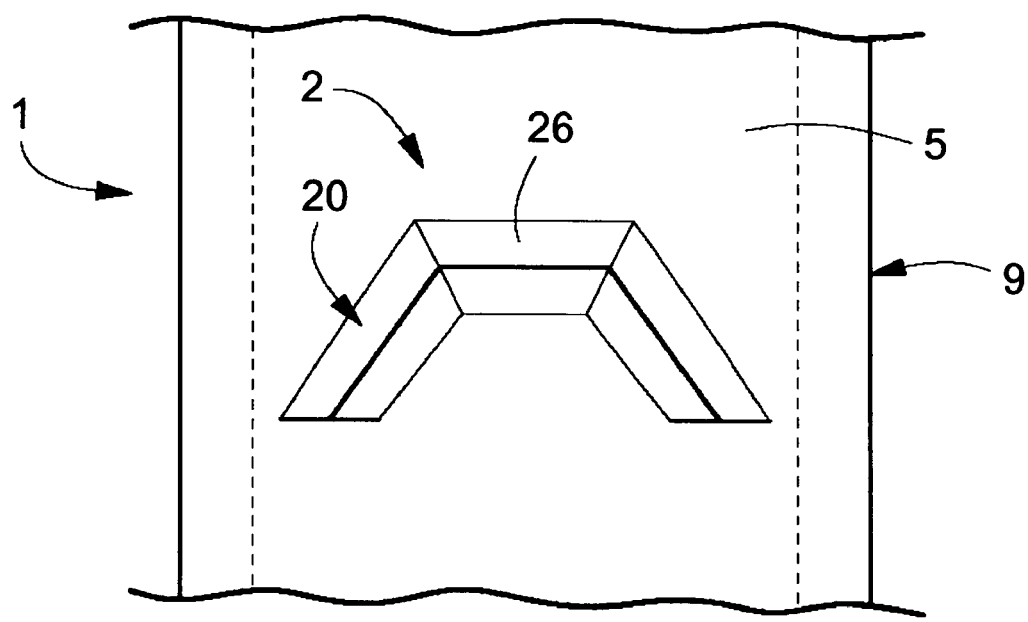
FIG. 7 is a side view of an opening vent of Embodiment 3.

FIG. 7 shows Embodiment 3 of the sealed prismatic battery of the invention. In Embodiment 3, a groove 20 of an opening vent 2 has center part 26 that extends linearly in a direction of thickness, and the groove 20 is shaped like a trapezoid, in side view, that extends downward from front and rear ends of the center part 26 so as to straddle. Other features are made the same as those of Embodiment 1.

Embodiment 4

Figure 8:
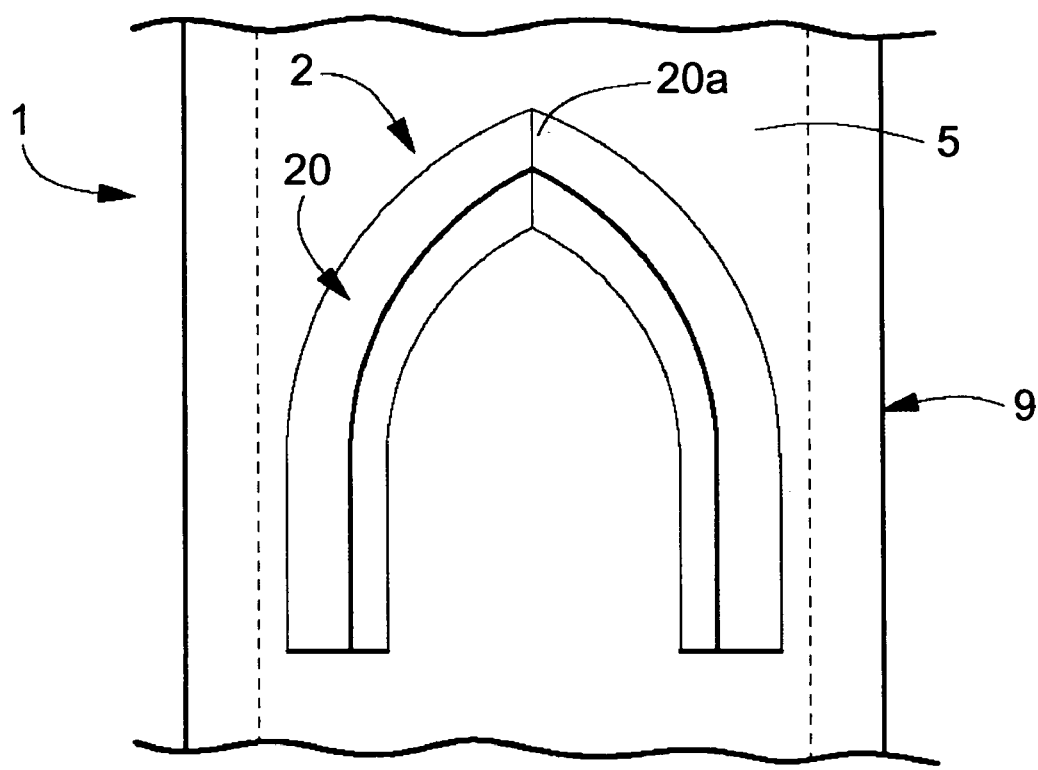
FIG. 8 is a side view of an opening vent of Embodiment 4.

FIG. 8 shows Embodiment 4 of the sealed prismatic battery of the invention. In a groove 20 of an opening vent 2 of Embodiment 4, middle of center curved part 20a is made in a slightly sharpened shape in contrast to Embodiment 1 in which the center curved part 20a is shaped like a circular arc. Other features are made the same as those of Embodiment 1.

Embodiment 5

Figure 9:
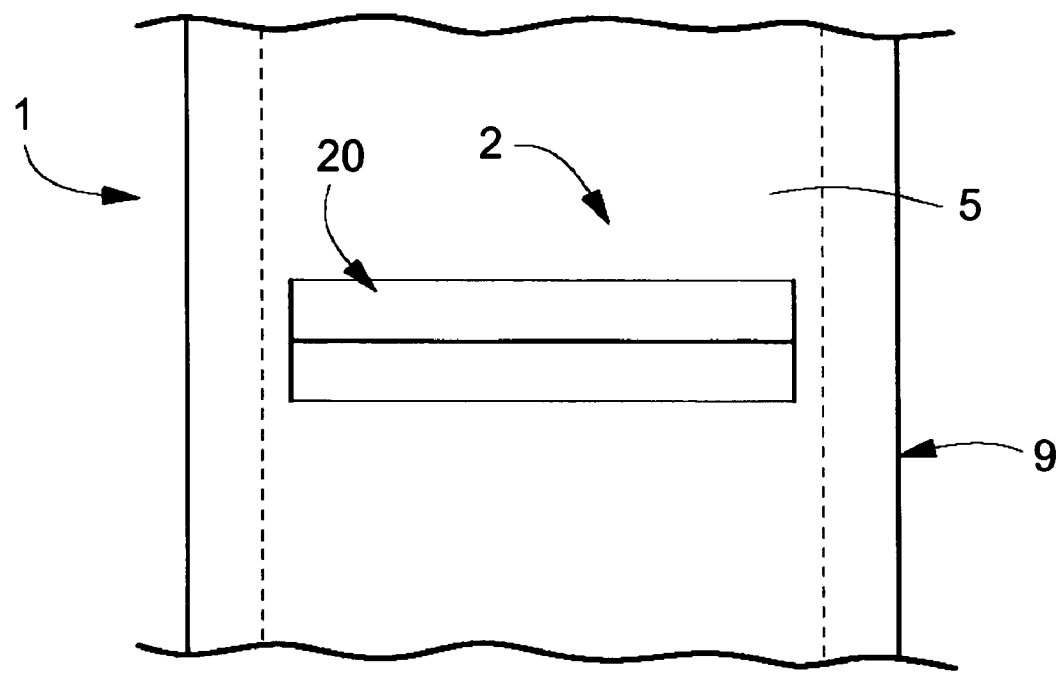
FIG. 9 is a side view of an opening vent of Embodiment 5.

FIG. 9 shows Embodiment 5 of the sealed prismatic battery of the invention. Embodiment 5 is the same as Embodiment 1 except that a groove 20 of an opening vent 2 is shaped so as only to extend linearly in a direction of thickness.

Embodiment 6

Figure 10:
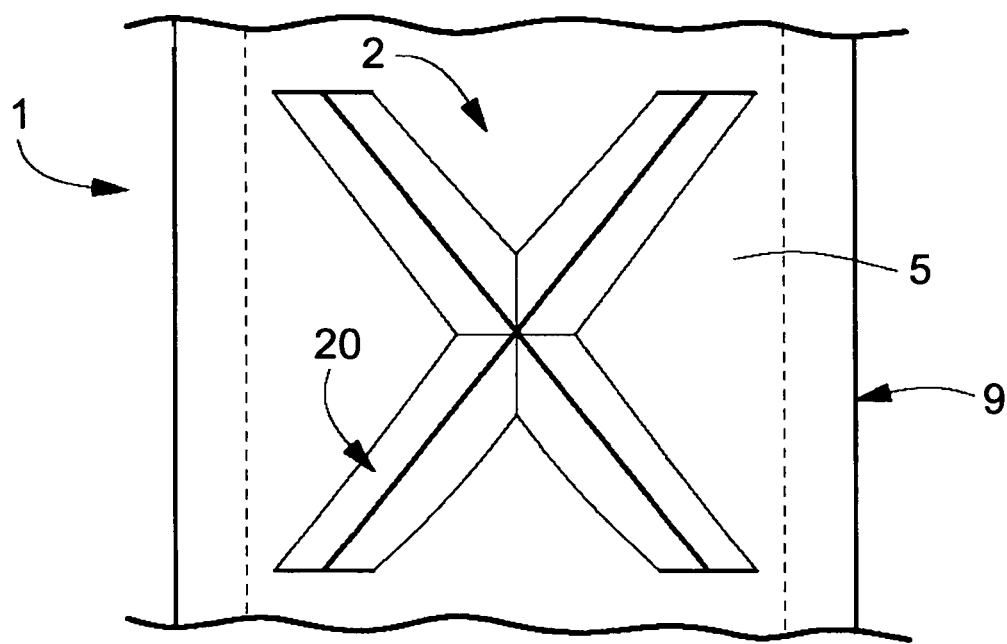
FIG. 10 is a side view of an opening vent of Embodiment 6.

FIG. 10 shows Embodiment 6 of the sealed prismatic battery of the invention. Embodiment 6 is the same as Embodiment 1 except that a groove 20 of an opening vent 2 is shaped like a letter x.

Embodiment 7

Figure 11:
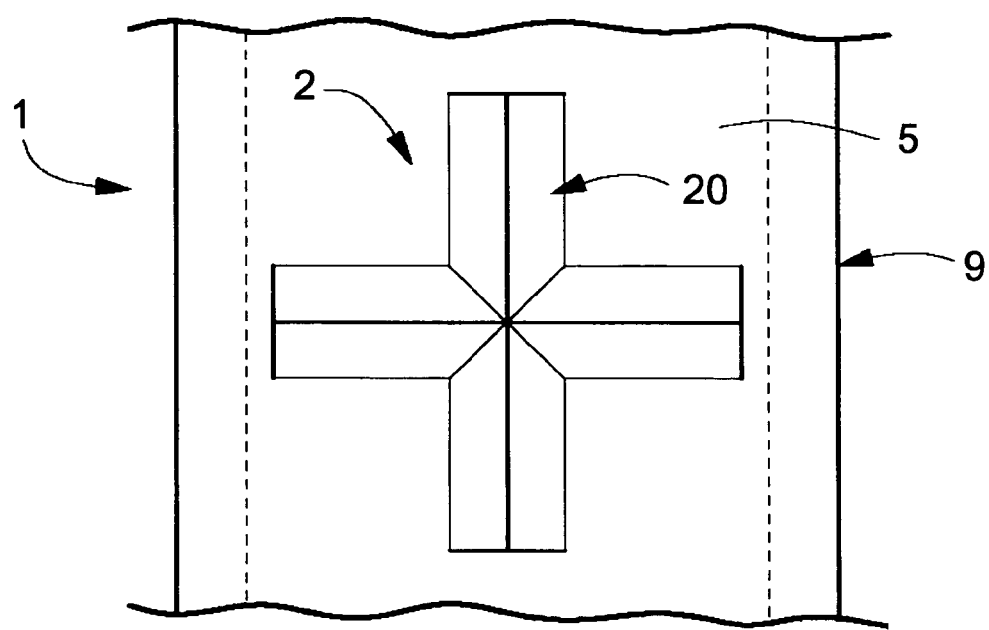
FIG. 11 is a side view of an opening vent of Embodiment 7.

FIG. 11 shows Embodiment 7 of the sealed prismatic battery that is an object of the invention. Embodiment 7 is the same as Embodiment 1 except that a groove 20 of an opening vent 2 is shaped like a cross.

For the opening vent 2 of the sealed prismatic battery 1 of the invention, the distance from the upper end of the casing body 9 to an upper end of the groove 20 or the distance from the lower end of the casing body 9 to a lower end of the groove 20 may be set between 3 and 20% of the longitudinal height of the casing body 9, and the groove 20 may be made into any shape, such as circle and ellipse, in side view. The groove 20 may be formed as a recess having a U-shaped section, a trapezoidal section or the like.

Although the present invention has been fully described by way of examples with reference to the accompanying drawings, it is to be noted that various changes and modifications will be apparent to those skilled in the art. Therefore, unless otherwise such changes and modifications depart from the spirit and the scope of the present invention, they should be construed as being included therein.

What is claimed is:

1. A sealed prismatic battery comprising:
    a battery casing which is shaped like an oval quadrangle having a width in a direction of thickness smaller than a height in a longitudinal direction and a length in a lateral direction and in which side walls facing in the lateral direction swell outward in the lateral direction so as to form circular-arc shapes in general; and
    an opening vent which is provided in vicinity of ends of at least one of the side walls of the battery casing facing in the lateral direction, wherein
    the battery casing includes a casing body which is formed by the side walls and bottom wall and has an opening upper face, and a lid wall closing the opening upper face,
    the opening vent is composed of a groove formed as a recess on the side wall, the groove having a convexed shape in the side view, a maximum point in the convexed shape being positioned at the lid-wall end side of the side wall of the battery casing, a distance from the lid-wall end of the side wall of the battery casing to the maximum point in the convexed shape of the groove being set between 3 and 20% of the height of the battery casing.

2. A sealed prismatic battery as claimed in claim 1, wherein the opening vent is formed as a recess having section shaped like a letter U or V.

3. A sealed prismatic battery as claimed in claim 1, wherein a thickness of the side wall in which the opening vent is provided is thicker than a thickness of the lid wall.

* * * * *